United States Patent [19]
Hansen

[11] Patent Number: 5,123,810
[45] Date of Patent: Jun. 23, 1992

[54] POWER TRANSMISSION

[75] Inventor: Lowell D. Hansen, Jackson, Miss.

[73] Assignee: Vickers, Incorporated, Troy, Mich.

[21] Appl. No.: 648,202

[22] Filed: Jan. 31, 1991

Related U.S. Application Data

[63] Continuation of Ser. No. 354,292, May 19, 1989, abandoned.

[51] Int. Cl.$^5$ .............................................. F04D 13/12
[52] U.S. Cl. .................................. 415/143; 415/58.4; 417/80; 417/203
[58] Field of Search ................ 415/143, 202, 58.4, 415/52.1; 417/201, 203, 205, 88, 89, 79, 80

[56] References Cited

U.S. PATENT DOCUMENTS

| | | | |
|---|---|---|---|
| 2,924,178 | 2/1960 | Hogan | 417/348 |
| 4,142,839 | 3/1979 | Davis et al. | 415/143 |
| 4,767,281 | 8/1988 | Sailer | 415/58.4 |

FOREIGN PATENT DOCUMENTS

| | | | |
|---|---|---|---|
| 653243 | 3/1929 | France | 417/80 |
| 188308 | 12/1966 | U.S.S.R. | 415/143 |

OTHER PUBLICATIONS

Conventional Impeller/Injector PF4-151-9A.
Torus Injector/Impeller PF-4-228-9E.
Conventional Impeller PF4-228-7E.
Pump PF4-070-3.

*Primary Examiner*—John T. Kwon
*Attorney, Agent, or Firm*—Barnes, Kisselle, Raisch, Choate, Whittemore & Hulbert

[57] ABSTRACT

A hydraulic fluid pump for aircraft turbine engine fuel delivery systems comprises a housing having a pump drive shaft mounted for rotation therewithin. A centrifugal pump stage includes an impeller coupled to the drive shaft and having a circumferential array of radially extending passages with inlet ends adjacent to the shaft and outlet ends at the periphery of the impeller. An inducer stage includes a spiral inducer coupled to the shaft to rotate coaxially with the impeller and having an outlet end adjacent to the inlet end of the impeller passages. An injector stage includes a passage in the housing for feeding fluid to the inlet end of the inducer, and a circumferential array of nozzle orifices in the housing aligned with the injector passage and receiving fluid from a collection cavity that surrounds the periphery of the impeller. The pump inlet is fed to the injector passage, with the injector nozzles cooperating with the passage to boost fluid pressure and flow through the passage to the inducer inlet, which in turn boosts fluid pressure and flow to the impeller.

8 Claims, 4 Drawing Sheets

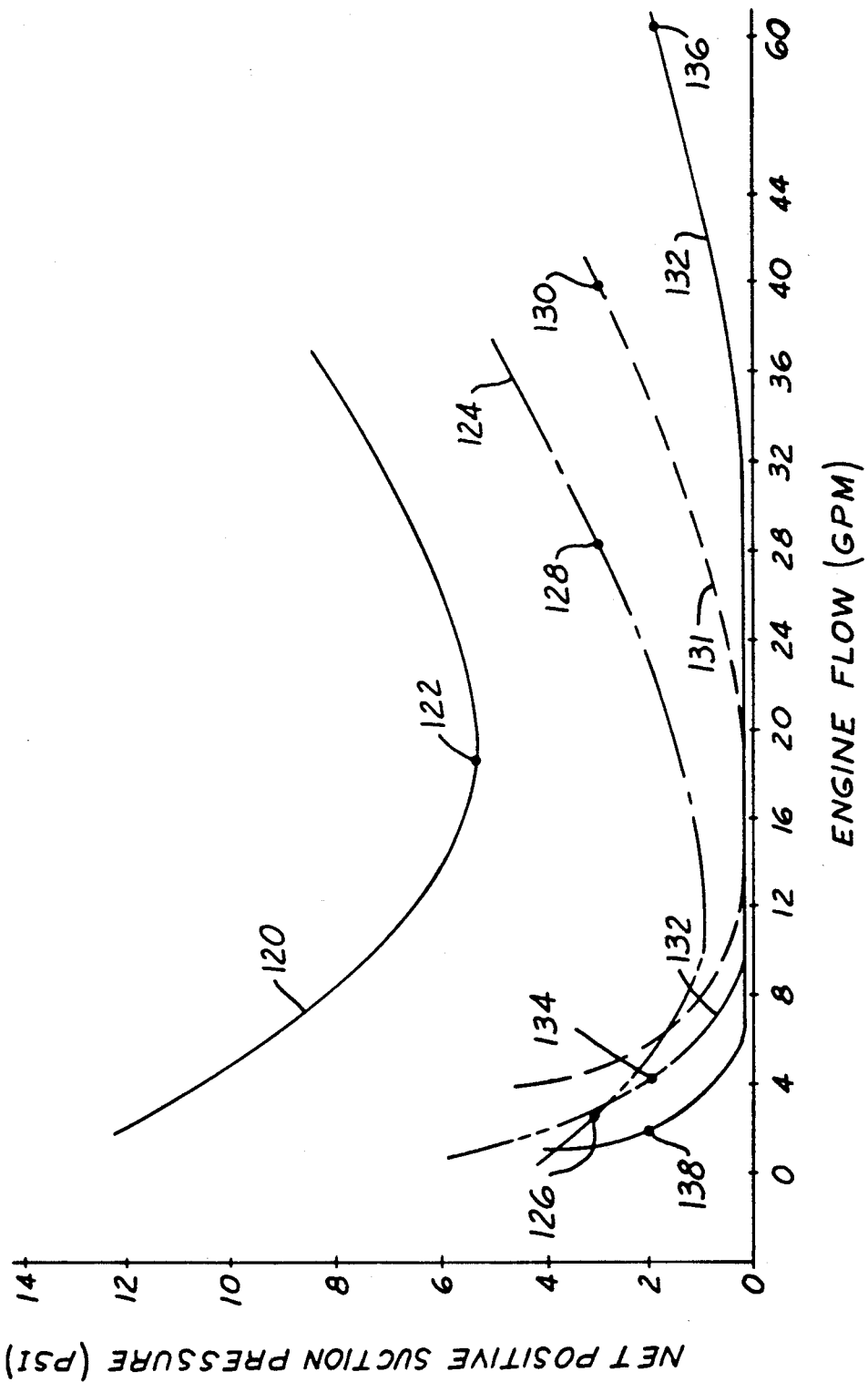

POWER TRANSMISSION

This is a continuation of copending application Ser. No. 07/354,292 filed May 19, 1989, now abandoned.

The present invention is directed to rotary hydraulic fluid pumps, and more particularly to a boost pump system having particular utility in aircraft turbine engine fuel delivery systems.

BACKGROUND AND OBJECTS OF THE INVENTION

Aircraft gas turbine engines are required to operate over a wide variety of inlet fuel conditions depending upon a number of parameters that affect the inlet. Inlet fuel conditions are most noticeably affected by loss of airframe boost pressure, or by a desire to operate in a suction-feed fuel delivery mode. Inlet fuel is also affected by fuel temperature, fuel true vapor pressure, line loss and fuel flow rate. Two primary design parameters are vapor/liquid ratio at the pump inlet and net positive suction pressure or NPSP, which is the pressure at the pump inlet above true vapor pressure of the fuel at the inlet temperature. System design specifications typically require fuel pumps to operate at a specified flow rate with a vapor/liquid inlet ratio of 0.45, and with an NPSP of 5.0 psi. Newer system specifications, however, typically require the 0.45 vapor/liquid inlet ratio capability over a wider fuel flow range, and may even require a 1.0 vapor/liquid ratio with intermittent all-liquid or all-vapor operation. Furthermore, the NPSP requirements have been increased typically to 5.0 psi over the entire fuel flow range, and in some cases even 1.0 psi over the entire flow range.

It is therefore a general object of the present invention to provide a hydraulic fluid pump that is capable of satisfying flow requirements in aircraft turbine engine fuel delivery systems over an extended engine operating range, and that is adapted to operate at a vapor/liquid inlet ratio of up to 1.0 without cavitation and at 2.0 psi NPSP over an extended fuel flow range. A further object of the present invention is to provide a fuel pump of the described character that is economical and efficient in construction in terms of the stringent weight and volume requirements of aircraft applications, and that provides reliable service over an extended operating life.

SUMMARY OF THE INVENTION

A hydraulic fluid pump for aircraft turbine engine fuel delivery systems and like applications in accordance with one aspect of the invention comprises a housing having a pump drive shaft mounted for rotation therewithin. A centrifugal pump stage includes an impeller coupled to the drive shaft and having a circumferential array of radially extending passages with inlet ends adjacent to the shaft and outlet ends at the periphery of the impeller. An inducer stage includes a spiral inducer coupled to the shaft to rotate with the impeller and having an outlet end adjacent to the inlet end of the impeller passages. An injector stage includes a passage in the housing for feeding fluid to the inlet end of the inducer, and a circumferential array of nozzle orifices in the housing aligned with the injector passage and receiving fluid from a collection cavity that surrounds the periphery of the impeller. The pump inlet is fed to the injector passage, with the injector nozzles cooperating with the passage to boost fluid pressure and flow through the passage to the inducer inlet, which in turn boosts fluid pressure and flow to the impeller.

In accordance with a second aspect of the invention, a fuel delivery system has a boost stage that includes centrifugal, inducer and injector stages as previously described, and a vane pump stage that receives inlet flow from the boost stage at the outlet of the impeller. The vane pump stage includes a rotor coupled to the shaft for rotation within the pump housing. The rotor has a plurality of radially extending peripheral slots, and a plurality of vanes are individually slidably disposed in the slots. A cam ring surrounds the rotor within the housing and has a radially inwardly directed cam ring surface that forms a vane track and at least one fluid pressure cavity between the cam ring surface and the rotor. The vane pump inlet is coupled to the impeller outlet at the collection cavity, and the vane pump outlet extends to a port in the pump housing.

BRIEF DESCRIPTION OF THE DRAWINGS

The invention, together with additional objects, features and advantages thereof, will be best understood from the following description, the appended claims and the accompanying drawings in which:

FIG. 5 is a graphic illustration useful in discussing operation of the invention.

DETAILED DESCRIPTION OF PREFERRED EMBODIMENTS

Figure 1:
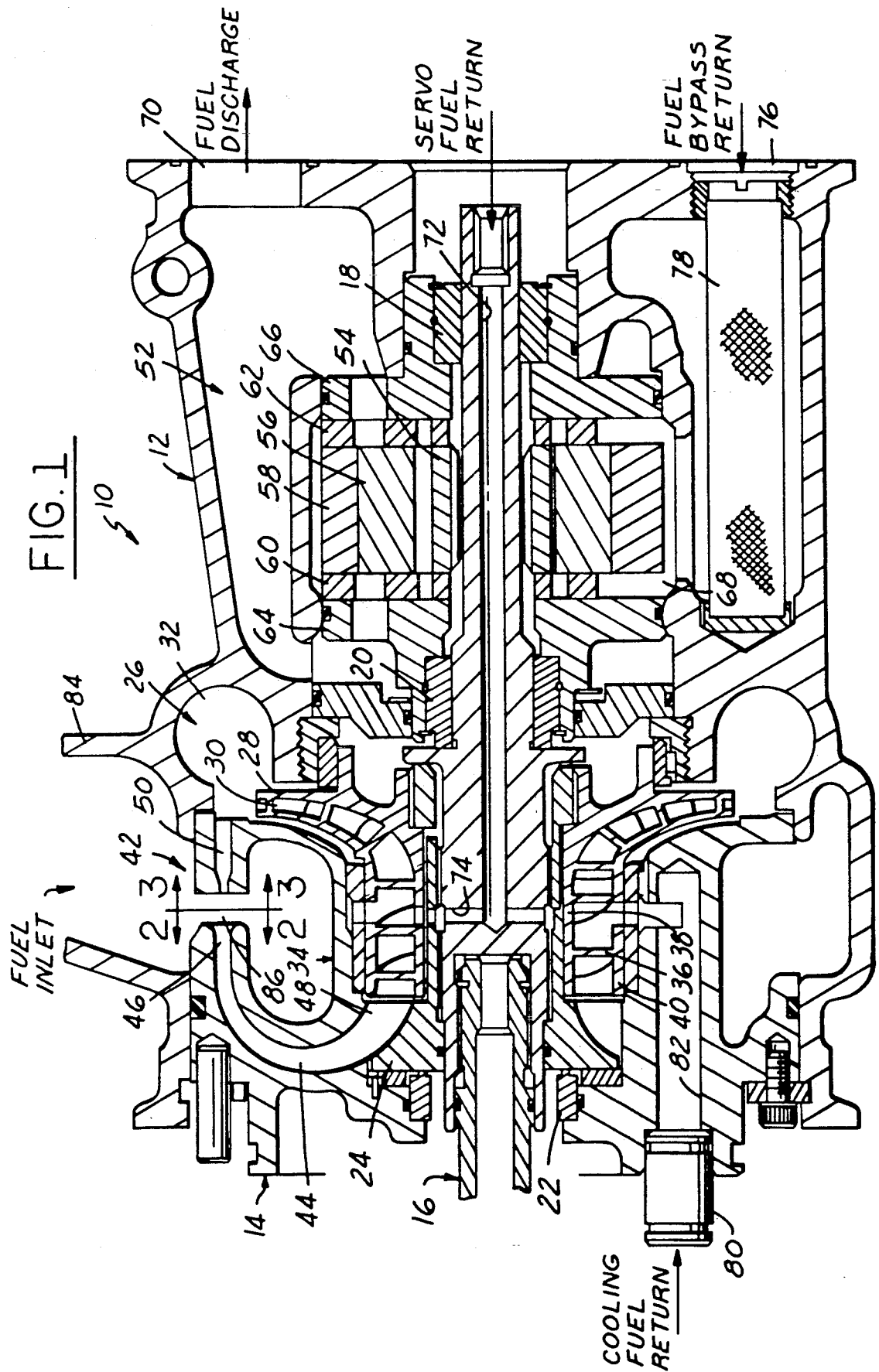
FIG. 1 is a sectioned side elevational view of a multiple-stage fuel pump for aircraft turbine engine and like applications in accordance with one presently preferred embodiment of the invention.

FIG. 1 illustrates a fuel pump 10 in accordance with a presently preferred embodiment of the invention as comprising a generally cup-shaped housing 12 having an open end closed by an end cover 14. A drive shaft 16 is rotatably supported within housing 12 by spaced bearing sleeves 18, 20. An annular seal 22 is carried by cover 14 and engages a flange 24 on shaft 16 for sealing the interior of housing 12. A pump impeller stage 26 includes an impeller 28 splined to shaft 16 and rotatable with shaft 16 within housing 12. Impeller 28 includes a circumferential array of spiral passages 30 that extend radially from inlet ends adjacent shaft 16 to outlet ends at the periphery of impeller 28. The outlet ends of impeller passages 30 open at the impeller periphery into an annular collection cavity 32 that is formed in housing 12 and surrounds the impeller periphery.

Figure 2:
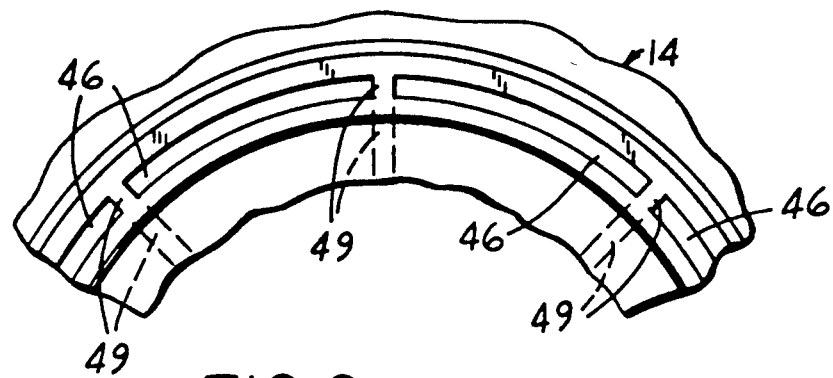
FIG. 2 and 3 are fragmentary sectional views taken along the respective lines 2—2 and 3—3 in FIG. 1.
Figure 3:
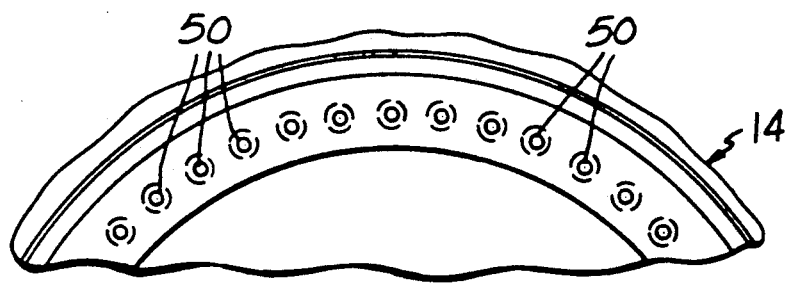

A pump inducer stage 34 includes spiral vanes 36 that project radially outwardly from a collar 38 formed as an integral axial projection of impeller 28 adjacent to the inner ends of passages 30. Spiral vanes 36 radially outwardly terminate in a second collar 40 integral with impeller 28. Vanes 36 and collars 38, 40 thus form a spiral fluid passage through the inducer that extends from an inlet end coaxial but spaced from impeller 28, to an outlet end that feeds the inner ends of passages 30 in impeller 28. A pump injector stage 42 is formed by a passage 44 in cover 14 that extends circumferentially at least partway around shaft 16. Passage 44 is arcuate in transverse cross section, as shown in FIG. 1, and widens from an inlet end 46 (FIGS. 1 and 2) spaced radially outwardly of inducer stage 34 to an outlet end 48 at the inlet end of inducer 34. Inlet end 46 is circumferentially segmented by strengthening ribs 49 (FIG. 2). A circumferential array of angularly spaced nozzle orifices 50 (FIGS. 1 and 3) are formed in cover 14 in axial alignment with but spaced from inlet end 46 of passage 44. Orifices 50 are positioned to receive fluid under pressure from collection cavity 32 at the periphery of impeller 28.

A vane pump stage 52 includes a rotor 54 that is splined to shaft 16 for rotation within housing 12. Rotor 54 has a plurality of radially extending peripheral slots. A plurality of vanes 56 are individually slidably disposed in corresponding ones of the rotor slots. A cam ring 58 is captured within housing 12 surrounding rotor 54 between bearing plates 60, 62 and port plates 64, 66. Cam ring 58 has a radially inwardly directed cam ring surface forming a vane track engaged by vanes 56, and simultaneously forming at least one fluid pressure cavity between the cam ring surface and the opposing rotor. The inlet 68 of vane pump stage 52 is connected to collection cavity 32 surrounding the periphery of impeller 28. The outlet of vane pump stage 52 is open to a fuel discharge port 70 in housing 12. Vane pump stage 52 is the subject of co-pending U.S. application Ser. No. 07/334,502 filed Apr. 7, 1989 assigned to the assignee hereof, the disclosure of which is incorporated herein by reference.

Return fuel from the fuel control servo valve system is fed to a passage 72 that extends axially through shaft 16 to terminate in a radial passage 74 that feeds inducer stage 34. Bypass fuel returned from the fuel control bypass and metering valve system is fed through a port 76 in housing 12, and through a cylindrical filter 78 to inlet 68 of vane pump stage 52. Fuel used within the engine system to cool engine components is fed through a fitting 80 in cover 14, and thence through a passage 82 in cover 14 to inducer stage 34. The primary fuel inlet 84 comprises a radially orientated port in housing 12 aligned with the gap or space 86 between nozzle orifice array 50 and injector passage end 46.

In operation, inlet fuel at port 84 is fed to the inlet end of inducer 34 through arcuate passage 44 of injector stage 42. Flow of fuel through passage 44 is assisted and boosted by fuel injected under pressure from cavity 32 through nozzle orifices 50. It will be noted that torous injector passage 44 serves as the primary fuel delivery passage to inducer stage 34. The use of an injector to supplement the inlet performance characteristics of the inducer enhances NPSP performance over a wider fuel flow range as compared with standard inducer arrangements. The small amount of injector orifice flow does not cause sufficient fuel heating to create an NPSP problem at low flow rates. Fuel supplied by injector 42 to the inlet end of inducer 34 is further boosted by the inducer to impeller stage 26, which feeds a small amount of pressurized fuel through injector nozzle orifices 50 as described, and feeds the bulk of pressurized fuel to vane pump stage 52. Vane pump 52 operates in the usual manner to additionally boost fuel pressure and flow to fuel discharge 70.

Figure 4:
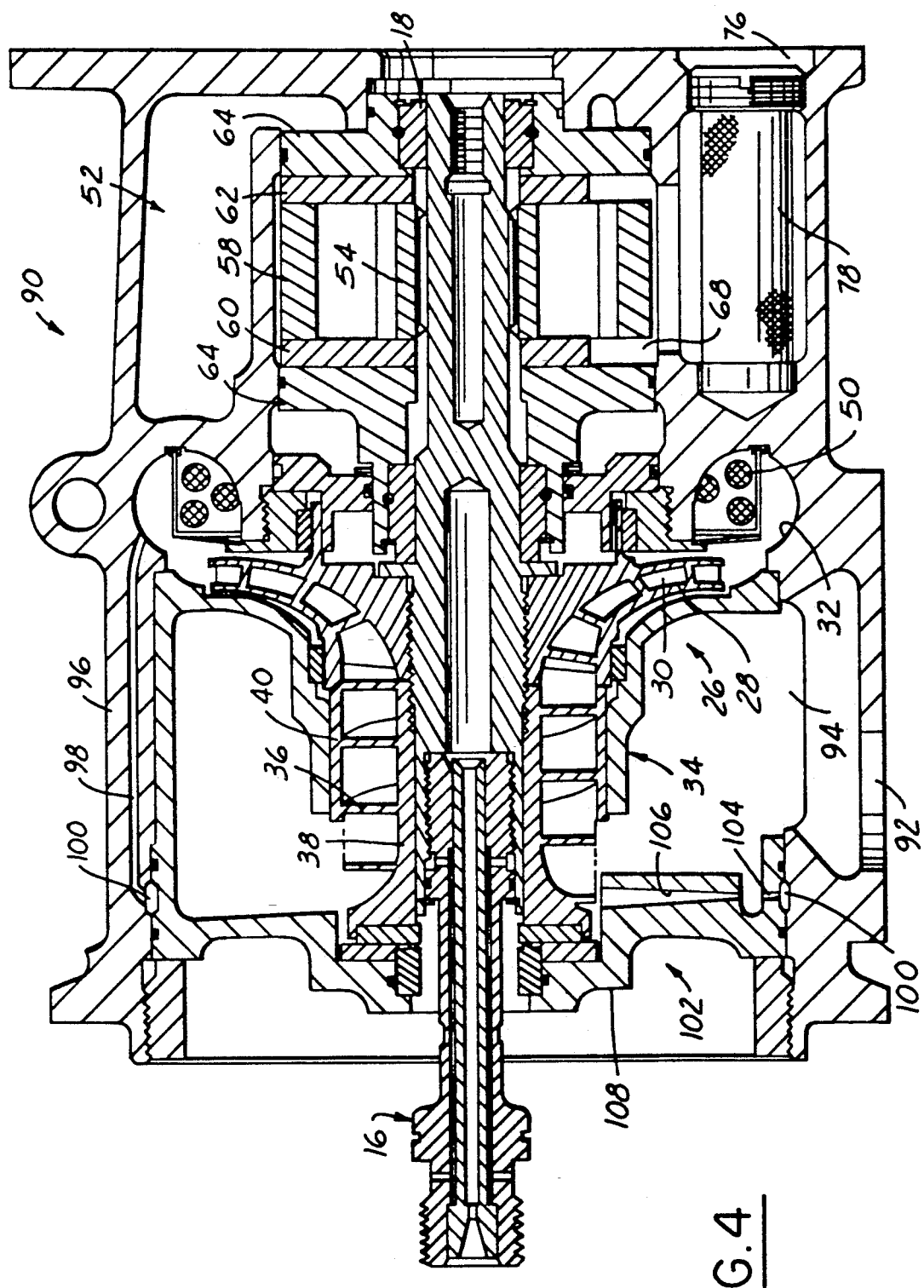
FIG. 4 is a sectioned side elevational view of an aircraft engine fuel pump in accordance with a second embodiment of the invention.

FIG. 4 illustrates a pump 90 in accordance with a second embodiment of the invention, in which elements functionally equivalent or similar to those in pump 10 hereinabove described in detail are indicated by correspondingly identical reference numerals. In pump 90, the pump inlet is formed by a radial passage 92 that opens into an annular chamber 94 within pump housing shell 96. Inducer 34 opens directly into chamber 94 and feeds fluid to impeller stage 26. The outlet of impeller stage 26 at cavity 32 is fed by a passage 98 in shell 96 to an annular cavity 100. Injector stage 102 comprises a circumferential array of nozzle orifices 104 that extend radially inwardly from cavity 100 into chamber 94, and thence through a circumferential array of individual radial injected passages 106 in cover 108 to a position adjacent to spiral fin 36 of inducer stage 34. Impeller stage outlet cavity 32 also communicates through filter 50 with vane stage 52. This configuration differs from that of FIG. 1 by permitting flow from cavity 94 to have two parallel paths to inducer 34—i.e., directly into the inducer or through the injector set 102. This concept embodies the use of the injector loop to increase the flow through the inducer 34 at low engine fuel flow rates. The injector system saturates out at higher engine flow and is effectively removed form the inlet flow due to the system flow rate needs.

FIG. 5 graphically illustrates engine flow against NPSP for various pump constructions operating 6700 to 6800 rpm on fuel MIL-T-5624, JP-4 at a fuel temperature of 135° F. Curve 120 illustrates operation of a pump having an impeller stage 26 but no inducer stage 34 or injector stage 42. The pump had one flow point 122 (about 20 gpm) where operation approached 5 psi NPSP. Addition of directional injectors yielded curve 124 having an extended flow range (about 4 to 27 gpm) between points 126, 128 at 3 psi NPSP. Use of a torous injector (42 in FIG. 1) extended the high end of the flow range to point 130 (about 40 gpm on curve 131). The combination of an inducer stage 34 and an impeller stage 26 yielded a curve 132 having an extended flow range (about 4.5 to 60 gpm) between points 134, 136 at a reduced NPSP of 2 psi. The full combination of inducer, injector and impeller stages illustrated in FIG. 4 would extend the low end of curve 132 to point 138, and thus increased the flow range to about 2 to 60 gpm below 2 psi NPSP.

I claim:

1. A hydraulic fluid pump for aircraft turbine engine fuel delivery systems and like applications that comprises:

a housing having a pump drive shaft mounted for rotation therewithin, a centrifugal pump stage that includes an impeller coupled to said shaft for rotation within said housing, said impeller having a circumferential array of radially extending passages with inlet ends adjacent to said shaft and outlet ends at the periphery of said impeller, and an annular fluid collection cavity in said housing surrounding said impeller periphery, an inducer stage that includes a spiral inducer coupled to said shaft to rotate with said impeller, said inducer having an outlet end adjacent to said inlet ends of said impeller passages and an inlet end axially spaced from said inducer outlet end, an injector stage that includes passage means in said housing for feeding fluid to said inducer inlet end and a circumferential array of nozzle orifices in said housing aligned with said passage means and receiving fluid from said collection cavity, and pump inlet means in said housing for feeding inlet fluid to said passage means in parallel with said nozzle orifices, said inlet means including means for feeding inlet fluid to said inducer inlet in parallel with and independent of said passage means.

2. The pump set forth in claim 1 wherein said inlet and outlet ends of said inducer are axially spaced from each other lengthwise of said shaft and at the same radial spacing from said shaft.

3. The pump set forth in claim 2 wherein said passage means widens from adjacent said nozzle orifices to adjacent said inlet end of said inducer.

4. The pump set forth in claim 2 wherein said impeller and said inducer are of one-piece integral construction.

5. The pump set forth in claim 2 wherein said passage means comprises a circumferential array of passages aligned with said nozzle orifices.

6. The pump set forth in claim 2 further comprising a vane pump stage that includes a rotor coupled to said shaft for rotation within said housing and having a plurality of radially extending peripheral slots, a plurality of vanes individually slidably disposed in said slots, means forming a cam ring within said housing surrounding said rotor and having a radially inwardly directed cam ring surface forming a vane track and at least one fluid pressure cavity between said surface and said rotor, a vane pump inlet in said housing coupled to said collection cavity, and a vane pump outlet in said housing.

7. The pump set forth in claim 2 wherein said passage means at least partially circumferentially surrounds said inducer in said housing for feeding fluid to said inducer inlet end from a position radially outwardly spaced from said inducer.

8. The pump set forth in claim 2 wherein said nozzle orifices are angularly spaced from each other and are positioned within said housing radially outwardly of said inducer surrounding said inducer and said shaft, said orifices being aligned with and opposed to said passage means.

* * * * *